(12) United States Patent
Galloway et al.

(10) Patent No.: US 6,308,465 B1
(45) Date of Patent: Oct. 30, 2001

(54) SYSTEMS AND UTILITY MODULES FOR BUILDINGS

(75) Inventors: Terry R. Galloway, Berkeley, CA (US); Dean Price, McLean, VA (US)

(73) Assignee: Equitech, Inc., Falls Church, VA (US)

( * ) Notice: Subject to any disclaimer, the term of this patent is extended or adjusted under 35 U.S.C. 154(b) by 0 days.

(21) Appl. No.: 09/337,592

(22) Filed: Jun. 21, 1999

(51) Int. Cl.$^7$ ........................................ E04B 2/14
(52) U.S. Cl. ........................ 52/79.1; 52/34; 52/220.3; 137/360
(58) Field of Search .................. 52/34, 79.1, 173.1, 52/220.2, 220.3, 292, 582.1; 137/360; 405/230, 231

(56) References Cited

U.S. PATENT DOCUMENTS

| | | | |
|---|---|---|---|
| 1,093,262 | * 4/1914 | Goldsborough | 405/230 |
| 2,194,279 | * 3/1940 | Goldsborough | 52/292 X |
| 3,073,342 | 1/1963 | Magorien . | |
| 3,266,825 | 8/1966 | Magorien . | |
| 3,334,659 | 8/1967 | Magorien . | |
| 3,492,767 | 2/1970 | Pincus . | |
| 3,670,764 | 6/1972 | Tindal . | |
| 3,694,973 | * 10/1972 | Unger | 52/34 |
| 3,707,165 | * 12/1972 | Stahl | 52/34 X |
| 3,742,666 | * 7/1973 | Antoniou | 52/220.3 X |
| 3,766,574 | * 10/1973 | Smid, Jr. | 52/34 X |
| 3,862,534 | 1/1975 | Coletti . | |
| 3,919,812 | 11/1975 | van der Lely et al. . | |
| 4,032,821 | 6/1977 | Keiser . | |
| 4,040,227 | 8/1977 | van der Lely et al. . | |
| 4,071,984 | 2/1978 | Larrow . | |
| 4,147,004 | * 4/1979 | Day et al. | 52/309.9 |
| 4,171,596 | 10/1979 | Varlonga . | |
| 4,280,307 | 7/1981 | Griffin . | |
| 4,395,051 | 7/1983 | Tonomura . | |
| 4,512,120 | 4/1985 | Lindal . | |
| 4,744,182 | 5/1988 | Shacket et al. . | |
| 4,813,193 | 3/1989 | Altizer . | |
| 5,515,655 | 5/1996 | Hoffman . | |
| 5,724,773 | * 3/1998 | Hall | 52/34 |
| 5,735,090 | 4/1998 | Papke . | |
| 5,758,461 | 6/1998 | McManus . | |
| 5,768,840 | 6/1998 | Feldpausch . | |
| 5,822,935 | 10/1998 | Mitchell . | |
| 5,881,511 | 3/1999 | Keller, Jr. . | |
| 5,890,341 | 4/1999 | Bridges et al. . | |
| 5,905,229 | 5/1999 | McKitrick et al. . | |

OTHER PUBLICATIONS

R–Control® Structural Building Panel for Residential and Commercial Construction, Manufactured by Premier Building Systems, 8 pages (1994).

* cited by examiner

*Primary Examiner*—Carl D. Friedman
*Assistant Examiner*—Kevin D. Wilkens
(74) *Attorney, Agent, or Firm*—Coudert Brothers (57) ABSTRACT

Utility modules used to form a utility distribution system, where the utility modules are disposed on a foundation with the construction of a building, and where the utility modules may be covered with panels. The utility modules include coupling elements at edge regions and at major surfaces thereof. When coupled together, the utility modules can form a utility distribution system which is used to distribute utility services throughout a building. The utility services can be provided by a utility service system, which preferably comprises a fuel cell.

19 Claims, 9 Drawing Sheets

SYSTEMS AND UTILITY MODULES FOR BUILDINGS

FIELD OF THE INVENTION

The present invention relates to systems and utility modules for buildings such as modular buildings.

BACKGROUND OF THE INVENTION

Conventional methods for constructing buildings are inefficient and expensive. For example, expensive foundations, time consuming "stick construction" methods, and specialized wiring and plumbing requirements in buildings contribute to the inefficiency and expense of constructing buildings according to traditional methods.

A major cost of construction is the installation of utility lines such as plumbing, electrical wiring, ducting, and communications lines within a building. For example, the installation of utility lines in buildings is typically performed by many different building trades (e.g., plumbers, electricians) at the site of construction. The use of such skilled labor at the site of construction is costly and time consuming.

The cost of installing utilities in buildings is even greater if the construction site is at a remote location (e.g., a location which does not have a suitable utility infrastructure). Even if utility services are available at the remote location, skilled personnel must travel to the remote location to install utility lines within the building being constructed. Consequently, the construction of buildings at remote locations can be especially costly and time consuming. As the cost of real estate in dense population centers continues to increase, constructing buildings in less expensive remote locations becomes more desirable.

Accordingly, improved systems and methods for constructing buildings such as modular buildings are desired.

SUMMARY OF THE INVENTION

One embodiment of the invention is directed to a utility module comprising: a body including a first surface, a second surface opposite the first surface, and an edge region between the first and second surfaces; a utility line within the body; a first coupling element at the edge region; and a second coupling element at the first surface in communication with the first coupling element via the utility line, wherein the first coupling element is capable of being coupled to a third coupling element by moving the first coupling element in a single direction towards the third coupling element.

Another embodiment of the invention is directed to a wall structure comprising: a utility module; and a structural insulated panel disposed adjacent to the utility module, wherein the utility module comprises a body including a generally planar first surface, a generally planar second surface opposite the first surface, and an edge region between the first and second surfaces, a utility line within the body, a first coupling element at the edge region, and a second coupling element at the first surface in communication with the first coupling element via the utility line.

Yet another embodiment of the invention is directed to a utility service and distribution system comprising: a utility service system comprising a fuel cell; and a utility distribution system operatively coupled to the utility service system, wherein the utility distribution system comprises a plurality of utility modules coupled together via quick-connect coupling elements on respective adjacent utility modules to provide communication between utility lines in the adjacent utility modules.

These and other embodiments of the invention are described in further detail below.

DETAILED DESCRIPTION

Embodiments of the invention can be used to produce buildings such as modular houses quickly and efficiently, and at lower costs than conventional construction methods. Like the components of modular houses, the utility modules can be prefabricated, and then shipped to the construction site for easy installation. Preferably, the utility modules are mass produced with an automated robotic assembly operation. The prefabricated utility modules preferably satisfy applicable building codes and the standards set by agencies such as Underwriter's Laboratories.

In preferred embodiments, quick-connect coupling elements permit the utility modules to be quickly coupled and uncoupled to other utility modules or other structures (e.g., fixtures). By using quick-connect coupling elements to connect many utility modules together, a utility distribution system can be formed quickly and efficiently, without the need for skilled personnel. The utility distribution system can distribute gas, electricity, and fluids such as water and sewage throughout a building, and between a building and a utility service system.

The gas and fluids which are distributed by the utility distribution system can be provided by a utility service system which is virtually self-sufficient. For example, the utility service system can convert at least some (e.g., most) of the waste generated by the occupants in a building into useful energy (e.g., at least 100 kW of power). This energy can be used by the occupants of the building so that a virtually self-sufficient, environmentally friendly building complex can be created. Advantageously, when using embodiments of the invention, buildings can be built at remote locations and utility services can be provided to the buildings even if a suitable pre-existing utility infrastructure (e.g., power grids) is not present at the remote location.

When constructing a building, the utility modules are disposed on a foundation. Preferably, a number of elongated load bearing members (e.g., steel piers) are attached to the foundation so that the foundation can be quickly and stably disposed on the ground. The load bearing members may be made of any suitable material including metals such as steel and composite materials. Composite materials (e.g., carbon or glass fiber-reinforced materials) are generally lighter than steel. Suitable load bearing members include augers having a diameter of about 4 to about 18 inches mounted on standard steel pipe about 2 to 5 inches in diameter. The length of the load bearing members may be up to 70 feet or more. Foundations with steel piers are commercially available from West Coast Relocatables, of Sacramento, Calif. By using elongated load bearing members in combination with the utility module embodiments, structurally stable buildings can be built quickly and efficiently. For example, it is estimated that a 50 unit modular apartment complex can be deployed in as little as two weeks or less using embodiments of the invention.

Figure 1:
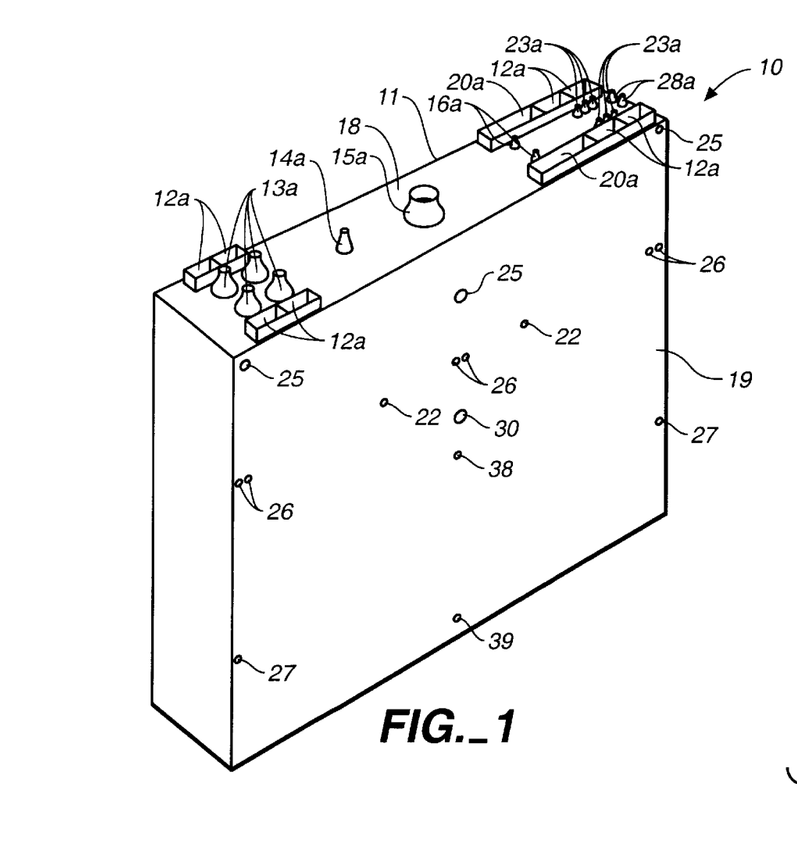
FIG. 1 is a perspective view of a vertical utility module.

FIG. 1 shows a vertically oriented utility module 10 according to an embodiment of the invention. The utility module 10 is preferably in the form of a parallelepiped. The utility module is shown in an upside-down position to show male coupling elements at the edge region 18. Although the utility module can have any suitable dimensions, typical utility modules may have a length or height of about 10 feet or less, a width of about 10 feet or less, and a thickness of about 5 feet or less.

The utility modules may be vertically or horizontally oriented and may be used in combination with one or more structural insulated panels to form a wall structure. In some embodiments, the utility modules may be sandwiched between two structural insulated panels. The structural insulated panels may be joined to the utility modules with adhesives, nails, bolts, etc. When structural insulated panels are used, the resulting wall structure can have an R value ranging between about 21.6 and about 24.7. The structural insulated panel may cover a major surface of the utility modules, and may be co-extensive with the major surface. The structural insulated panels of the wall structure preferably have holes so that coupling elements from the adjacent utility module can pass through the holes and are available for coupling to fixtures or other utility modules. Suitable structural insulated panels include materials such as concrete, concrete composites, foam, and polymeric materials such as polyurethane or expanded polystyrene (EPS). For instance, the structural insulated panels may include expanded polystyrene insulation adhesively welded between oriented strand board (OSB) facings. Structural insulated panels which can be used include commercially available structural insulated panels such as R-CONTROL@. R-CONTROL in generic terms, comprises panels constructed from lumber facings and a solid insulation inside, and sealed during the installation process so that air does not moves through the panels.

In other embodiments, the structural insulated panels may include rigid cellular polyurethane compositions, referred to herein as polyurethane rigid foam or PUR foam. These foams can include polyurethane, polyisocyanate and polyurethane-polyisocyanurate structural foams formed by combining a suitable catalyst with a precursor mixture. Such mixtures typically include a polyol, an isocyanate, a blowing agent, and a foam stabilizer. A suitable mixing device or mold is used to produce a foamed plastic.

The utility module 10 includes a body 11 having a first surface 19 and a second surface (not shown) opposite the first surface 19. In this example, both the first and the second surfaces are also major surfaces of the body 11 and are generally planar and rectangular. An edge region 18 of the body 11 is intermediate the first surface 19 and the second surface. The edge region 18 may also partially define the first and second surfaces. While the body can be made of any suitable material, the body 11 preferably includes a fiber-reinforced polymeric material.

As shown in FIG. 1, the utility module 10 includes a number of coupling elements disposed at the edge region 18 and at the first surface 19. Coupling elements may also be provided at the second surface (not shown) or at other regions of the utility module. When cooperatively structured coupling elements on adjacent utility modules are coupled together, utility lines (e.g., electrical liens) in the adjacent utility modules are in communication with each other. For example, any of the male coupling elements at the edge region 18 of the utility module shown in FIG. 1 can be a first coupling element, while a coupling element at the first surface 19 in communication with the first coupling element, can be a second coupling element. The male coupling elements at the edge region 18 can be coupled with female coupling elements, which can be third coupling elements, on the horizontal oriented utility module 40 shown in FIG. 2. Once the vertical utility module 10 and the horizontal utility module 40 are joined together, the utility lines in these respective utility modules communicate with each other. Structure 17 is the top face of the utility module 40.

Any suitable number or types of utility lines can be present in the utility modules. The utility lines may include plumbing lines. (e.g., pipes), heating lines lines, electrical lines (e.g., wires), communications lines, exhaust lines, sewage lines etc. Communication lines (e.g., telephone lines) in the utility module are preferably shield from electomagnetic radiation which might otherwise interfere with communications. Example of communications lines include telephone lines, TV lines (e.g., HDTV, cable TV), and lines for Internet access. One or more of these communication lines may be in communication with the utility service system, which is described in further detail below.

The utility modules are preferably pre-approved to comply with applicable building codes (e.g., local building codes) and the requirements of agencies such as Underwriter's Laboratory. Accordingly, the modules can be transported to the construction site and installed without skilled electricians, plumbers, etc. being present at the construction site. At the construction site, less skilled personnel can simply push and plug the modules together without the need for skilled personnel to verify that the utility installation complies with, e.g., local building codes. Consequently, building costs are reduced using embodiments of the invention.

Figure 10A:
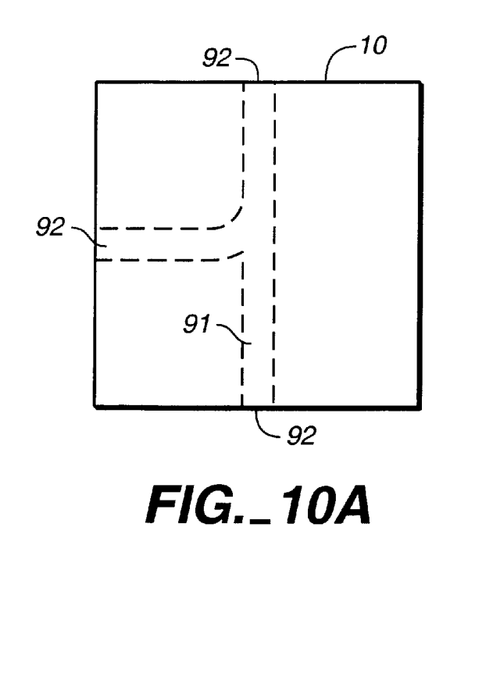
FIGS. 10(a)–(c) show plan views of utility modules with in phantom lines showing utility lines.
Figure 10B:
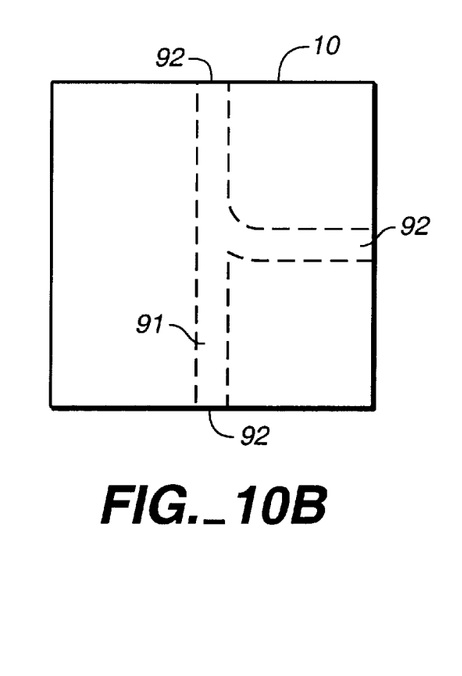
Figure 10C:
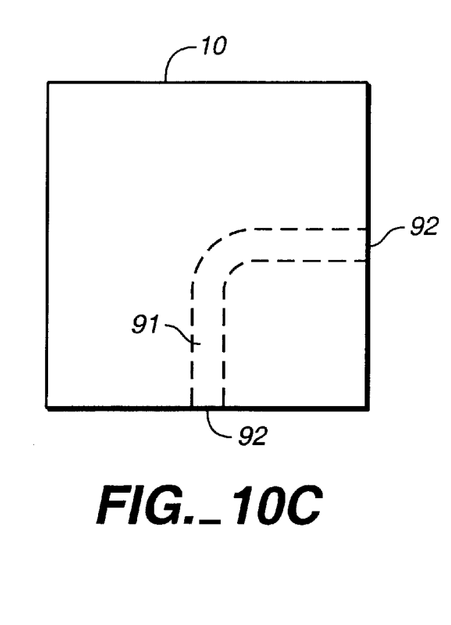

The utility lines in the utility module can terminate at any region (e.g., edge region) of the utility module. In embodiments of the invention, a utility line in the utility module can form a communication path between, for example, portions of two different edge regions, a portion of an edge region and a portion of a major surface, and a portion of a major surface and a portion of another major surface of the utility module (or body thereof). Coupling elements are present at the ends of the utility lines in the utility module. For example, with reference to FIGS. 10(a), 10(b), and 10(c), the utility modules 10 may have utility lines 91 which terminate at different portions 92 of different edge regions. Coupling elements may be disposed at these portions 92 so that the utility modules 10 can be coupled to other utility modules or structures.

One or more fixtures may be coupled to the first surface of the utility module 10 via coupling elements at the first surface. Flexible lines to these fixtures or the fixtures themselves preferably have coupling elements cooperatively structured with the coupling elements at the first surface (or major surface) of the body of the utility module. When coupled to the utility module, the fixtures can communicate with the utility lines in the utility module. For example, the hot and cold domestic water line coupling elements 26 and 27 at the first surface 19 of the utility module 10 can be in communication with the coupling elements 28(a) at the edge region 18 of the utility module 10. In this example, hot and cold domestic water is supplied through the coupling elements 28(a), flows through hot and cold water conduits (not shown) in the utility module 10, and exits the utility module 10 through the hot and cold domestic water line coupling elements 26 and 27. Water dispensing fixtures such as a faucet or shower head may be operatively coupled to the hot and cold domestic water line coupling elements 26 and 27 to receive hot and cold water.

Any number or type of coupling element can be present at the edge region of the body of the utility module. For example, the edge region 18 of the vertical utility module 10 shown in FIG. 1 includes exhaust line coupling elements 12(a), heating and cooling fluid line coupling elements 13(a), power service line coupling elements 16(a), hot and cold domestic water line coupling elements 28(a), communication line coupling elements 23(a), electrical chase coupling elements 20(a), and a vent coupling element 14(a). A stack coupling element 15(a) can also be provided at the edge region 18 of the utility module 10 to provide communication between, e.g., a sewage line within the utility module 10 and a sewage line in another structure. One or more of the same or different coupling elements may be omitted or added to the utility module 10. The coupling elements can be made of any suitable material including stainless steel, aluminum or fiber-reinforced plastic composite materials.

The coupling elements at the edge region may alternatively be coupled to a device having a number of flexible utility lines. For example, a device having a mounting bracket with a number of flexible pipes or wires attached to the mounting bracket can be cooperatively mounted on the coupling elements of the utility module. Once mounted, the utility lines of the utility module can communicate with the flexible pipes and wires mounted to the mounting bracket. Mounting bracket assemblies such as these are described in further detail in U.S. Pat. No. 3,670,764, which is incorporated by reference in its entirety for all purposes.

The coupling elements at the first surface can be coupled to fixtures such as bathroom, kitchen, or lighting fixtures. In this regard, coupling elements for fluid lines (e.g., plumbing lines) can be provided. For example, the coupling elements 25 at the first surface can be coupled to the drain of a shower, bathtub or sink, while the coupling elements 26 and 27 at the edge region can be coupled to water dispensing fixtures such as hot and cold water faucets. The coupling elements 22 can be coupled to a water closet. Coupling elements for electrical lines may also be provided. For instance, coupling elements 38, 39 can provide electrical coupling between, e.g., a light fixture present within the subsequently constructed room and electrical lines within the utility module 10. Structures such as venting ports 30 may also be provided at the first surface.

The coupling elements are preferably quick-connect coupling elements, which provide a secure connection (e.g., fluid tight) after being coupled together. In embodiments of the invention, a pair of cooperatively structured quick-connect coupling elements can be connectable by a continuous unidirectional motion of either coupling element. For example, a male coupling element can be coupled to a female coupling element by moving one of the coupling elements in a single continuous direction towards the other coupling element. By providing the utility modules with quick-connect coupling elements, the utility modules may be quickly coupled and uncoupled to other utility modules or other structures (e.g., fixtures), thus reducing the time needed to construct a building.

An especially preferred female coupling element comprises balls and an annular retainer which has holes adapted to receive the balls upon coupling. When a male coupling element is inserted into the annular retainer, the balls are received in the holes and lie in a groove on the male coupling element, thus coupling the coupling elements together. A fluid pathway in the female coupling element preferably does not open until the male coupling element is inserted therein. However, once coupled, the fluid pathway opens. Examples of quick-connect coupling elements include those shown in U.S. Pat. Nos. 3,073,342, 3,266,835, and 3,334,659, which are herein incorporated by reference in their entirety for all purposes.

Figure 2:
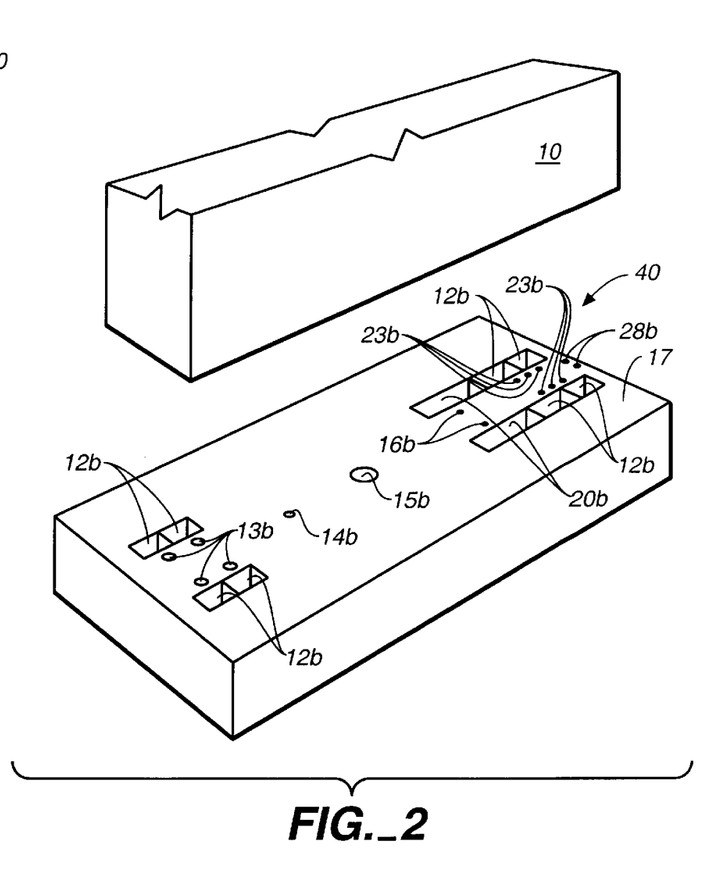
FIG. 2 is a perspective view of a vertical utility module and a horizontal utility module.

As shown in FIG. 2, a vertical utility module 10 may be coupled to the horizontal utility module 40. The male quick-connect coupling elements 12(a), 13(a), 14(a), 15(a), 16(a), 20(a), 23(a), and 28(a) at the edge region 18 of the vertical utility module 10 can be respectively coupled to the female quick-connect coupling elements 12(b), 13(b), 14(b), 15(b), 16(b), 20(b), 23(b), and 28(b) at the edge regions of the horizontal utility module 40. Additional coupling elements (not shown) can be provided at the edge regions of the horizontal utility module 40 so that the horizontal utility module 40 can be coupled to another utility module or another structure.

Alignment elements (not shown) can be used to align utility modules prior to coupling them together. For example, male alignment pins can be present on an edge surface of a utility module. These alignment pins are preferably longer than the coupling elements and can be inserted into corresponding alignment holes on another utility module to help align and guide the utility modules together so that the coupling elements on the respective modules properly mate.

Figure 3A:
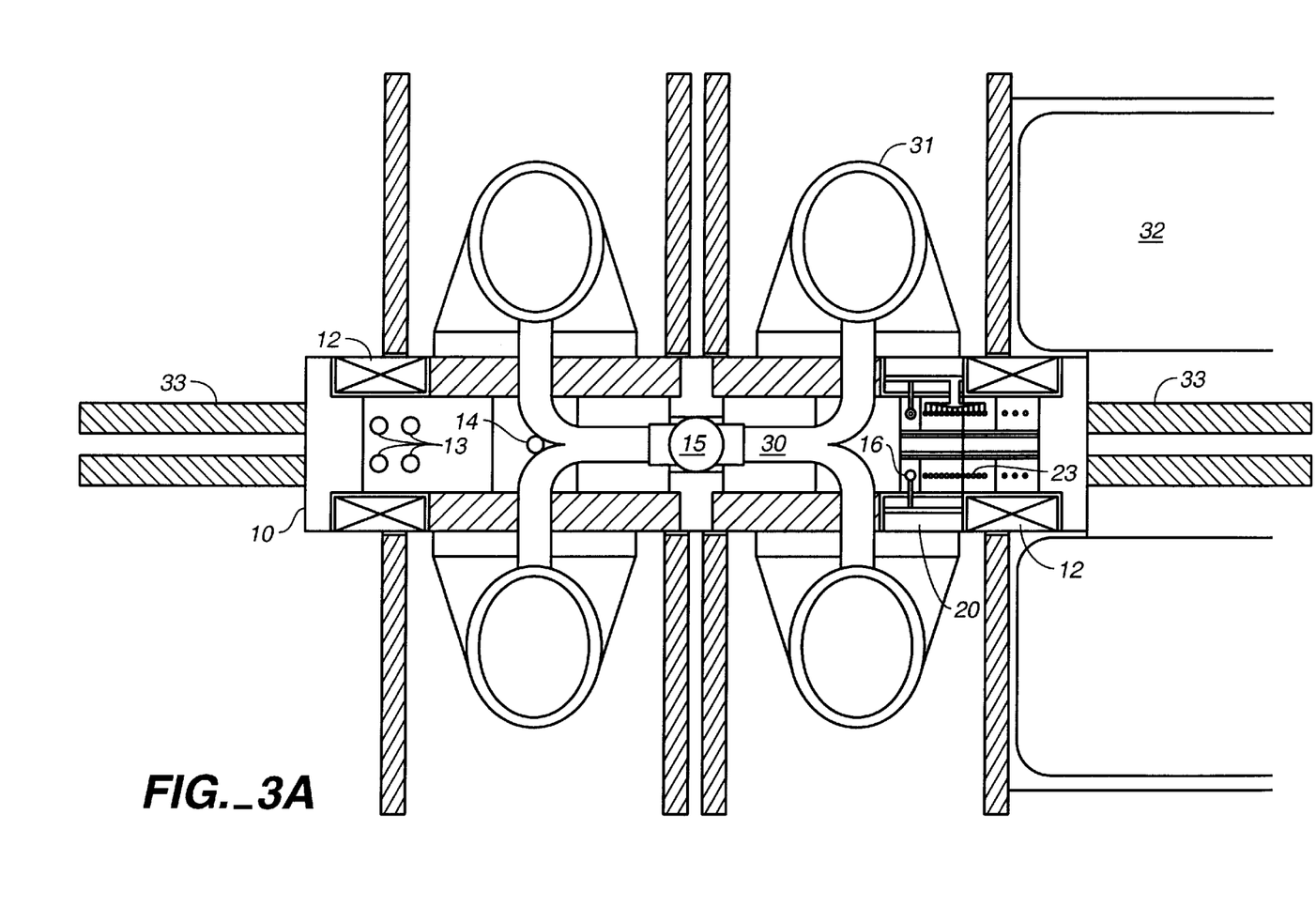
FIG. 3(a) is a cross-sectional view of a utility module connected to various bathroom fixtures.

FIG. 3(a) shows how a vertically oriented utility module 10 can be used. The utility module 10 shown in FIG. 3 includes heating and cooling lines 13, a vent line 14, communication lines 23, exhaust ducts 12, power service lines 16, a chase 20 for electrical lines, and a stack 15. The stack 15 may be used as a conduit for transporting sewage. As shown in FIG. 3(a), commodes 31 can be coupled to the vertical utility module 10. Each of the commodes 31 can communicate with the stack 15 via a sewage conduit 30. Each of the commodes may also be coupled to the sewage conduit 30 at opposing major surfaces of the utility module 10 via quick-connect coupling elements (not shown). A bathtub 32 may also have a drain which communicates with the sewage conduit 30 via another conduit (not shown). Two party wall structures 33 may be disposed at opposite edge regions of the vertical utility module 10 providing a contiguous structure separating rooms in the formed building. As is illustrated in FIG. 3(a), a number of fixtures can be quickly and efficiently coupled to major surfaces of a utility module 10.

Figure 3B:
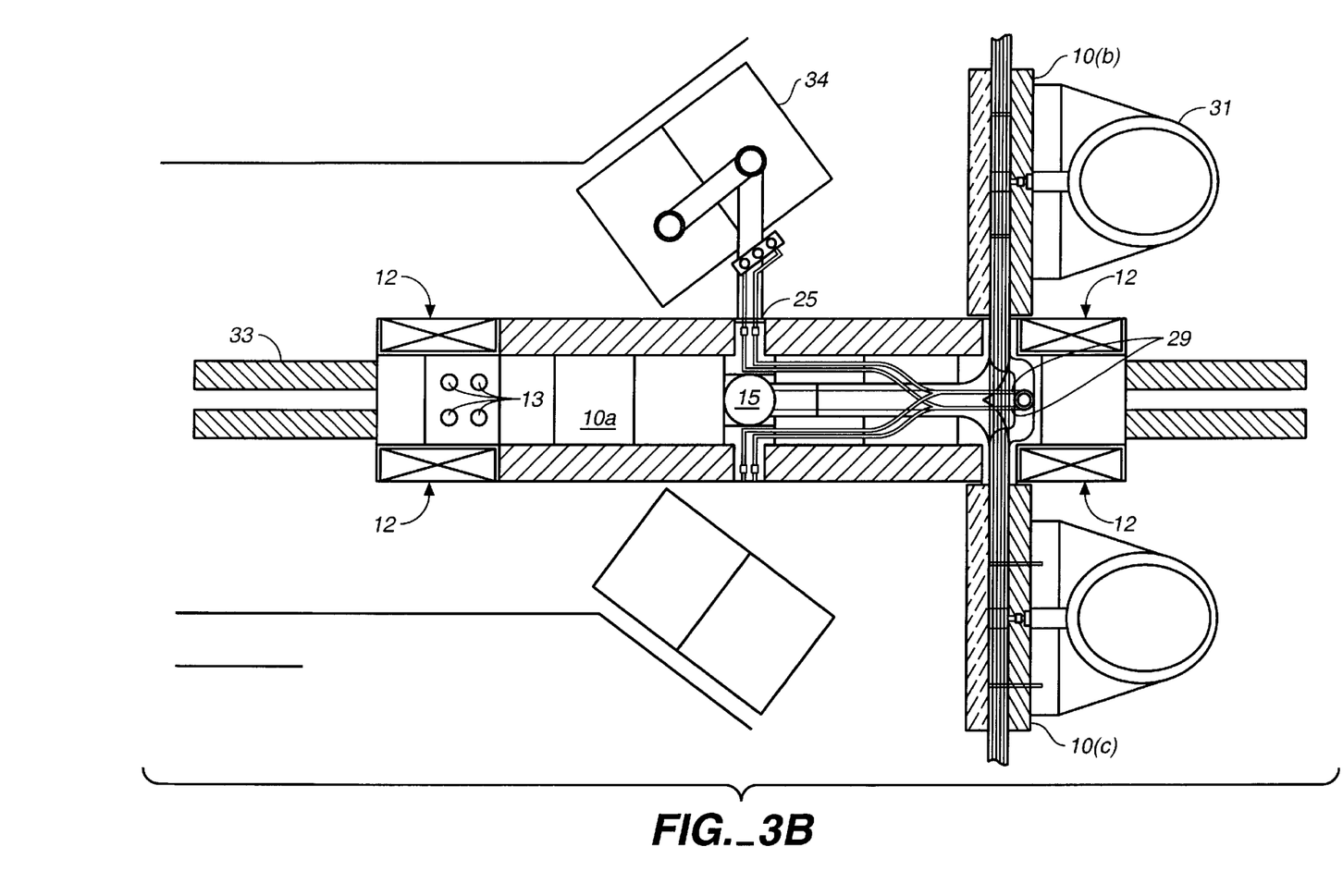
FIG. 3(b) is a cross-sectional view of a utility module connected to various bathroom fixtures and a sink.

FIG. 3(b) shows a first vertical utility module 10(a) with exhaust ducts 12, heating and cooling lines 13, a stack 15, and cold and hot water lines 29. As in FIG. 3(a), two party wall structures 33 are disposed at opposite edge regions of the vertical utility module 10(*a*). A sink 34 is coupled to the vertical utility module 10(*a*) via quick-connect coupling elements 25. The faucet for the sink can communicate with the hot and cold water lines 29 via conduits in the vertical utility module 10(*a*). Additionally, a drain in the sink can communicate with the stack 15 via a conduit in the vertical utility module 10(*a*).

In embodiments of the invention, one or more utility modules may be coupled to each other so that utility lines therein can be connected together to form a utility distribution system. The utility distribution system is preferably 3-dimensional and can be an integral part of a building, so that utility services are distributed to different parts of the building. For example, the edge regions of adjacent utility modules may be joined so that they are stacked on top of each other or are in a side-by-side relationship. The utility modules may also be joined together so that they are perpendicular to each other. With reference to FIG. 3(*b*), the ends of vertical utility modules 10(*b*) and 10(*c*) are coupled to opposing major surfaces of the vertical utility module 10(*a*). Commodes 31 are coupled to respective major surfaces of vertical utility modules 10(*b*) and 10(*c*), preferably via quick-connect coupling elements. The commodes 31 communicate with the stack 15 via one or more sewage conduits passing through the vertical utility modules 10(*a*), 10(*b*), and 10(*c*). As is apparent from FIGS. 3(*a*) and 3(*b*), utility modules can be connected together to form a utility distribution system.

Figures 4, 5:
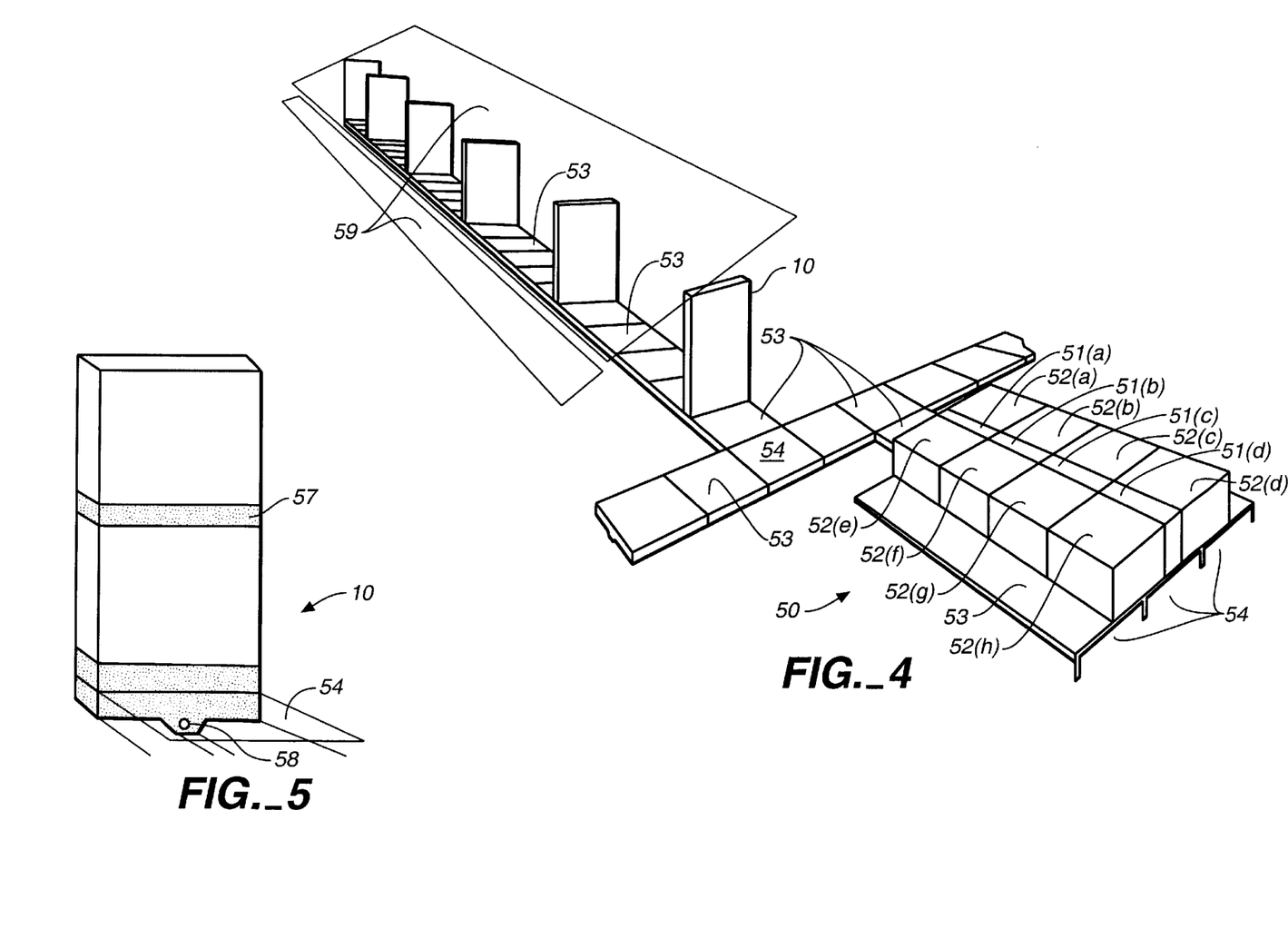
FIG. 4 is a perspective view of utility distribution system and a utility service system including a solar panel shown by in Pharton.
FIG. 5 is a perspective view of a vertical utility module connected to a horizontal utility modul by in Phanton.

In addition to distributing utility services to different rooms within a building, the utility distribution system embodiments can also distribute utility services between a utility service system and one or more buildings in communication with the utility service system. For example, FIG. 4 shows a schematic diagram of a utility distribution system 53 and a utility service system 50, which can both be present at a building complex such as a modular housing complex. The utility service system 50 can meet substantially all of the energy requirements for the building complex. Preferably, the building complex including the utility service system 50 occupies less than one square mile of land.

The utility distribution system 53 may include a plurality of horizontal utility modules 54 and vertical utility modules 10 coupled together to form a network of utility lines. With reference to FIG. 4, the utility distribution system 53 is used to transport electricity and fluids between the utility service system 50 and a building (not shown) including the vertical utility modules 10. The horizontal utility modules 54 between the utility distribution system 53 and the building may be encased with precast structural reinforced lightweight concrete sections so that the contiguous concrete/horizontal utility modules 54 may also be used as a sidewalk, road, or other structure.

FIG. 5 shows a vertical utility module 10 having a top portion and a bottom portion. The bottom portion is coupled to a horizontal utility module 54. As shown in FIG. 5, a sewage outlet 58 is present at the bottom portion of the vertical utility module 10 so that sewage can pass from the vertical utility module 10 to the horizontal utility module 54. Although the bottom portion of the utility module 10 has a polygonal shape, the utility module may have any suitable shape including a rounded shape.

The top portion and the bottom portion of the vertical utility module 10 can be separated by an intermediate portion 57 which can correspond to the area where the floor of the second floor of a building is present. The intermediate portion may have one or more coupling elements (not shown) so that edge regions of one or more horizontal utility modules (not shown) can be joined to the intermediate portion 57 to form a 3-dimensional utility distribution system. These horizontal utility modules can provide utility services to the rooms forming the second floor of the building. Thus, in some embodiments, a single vertical utility module can be used to provide utility services to two or more floors in a building.

Figure 6:
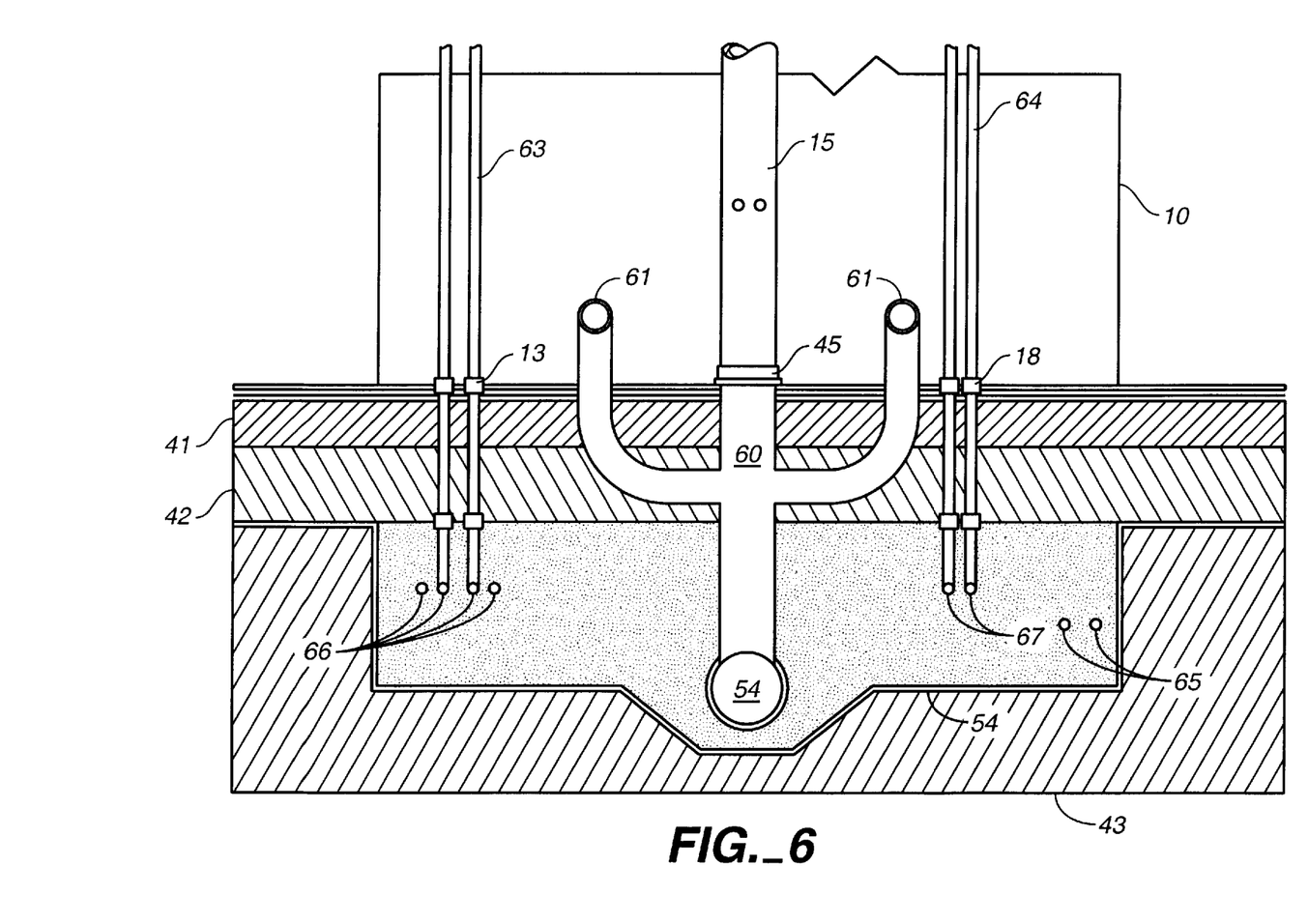
FIG. 6 is a cross-sectional view of a horizontal utility module in communication with a vertial utility module.

In FIG. 6, a horizontal utility module 54 is disposed in the ground 43, and includes a sewer conduit 59 which is coupled to a utility service system. A number of electrical or fluid conduits 65, 66, and 67 may also be provided in the horizontal utility module 54. A structural floor sandwich system having distinct layers 41, 42 can be disposed on top of the horizontal utility module 54, and a vertical utility module 10 is disposed on the structural floor sandwich system. Quick connect coupling elements 13, 18, 45 can be used to provide a connection between utility lines 15, 63, 64 in the vertical utility module 10 to utility conduits in the structural floor sandwich system. Quick connect coupling elements (not shown) may couple utility lines in the structural floor sandwich system to utility lines in the horizontal utility module 54. Sewage in the stack 15 or in sewage passages 61 may pass through the sewage conduit 60, which is coupled to the sewer conduit 59.

Figure 8:
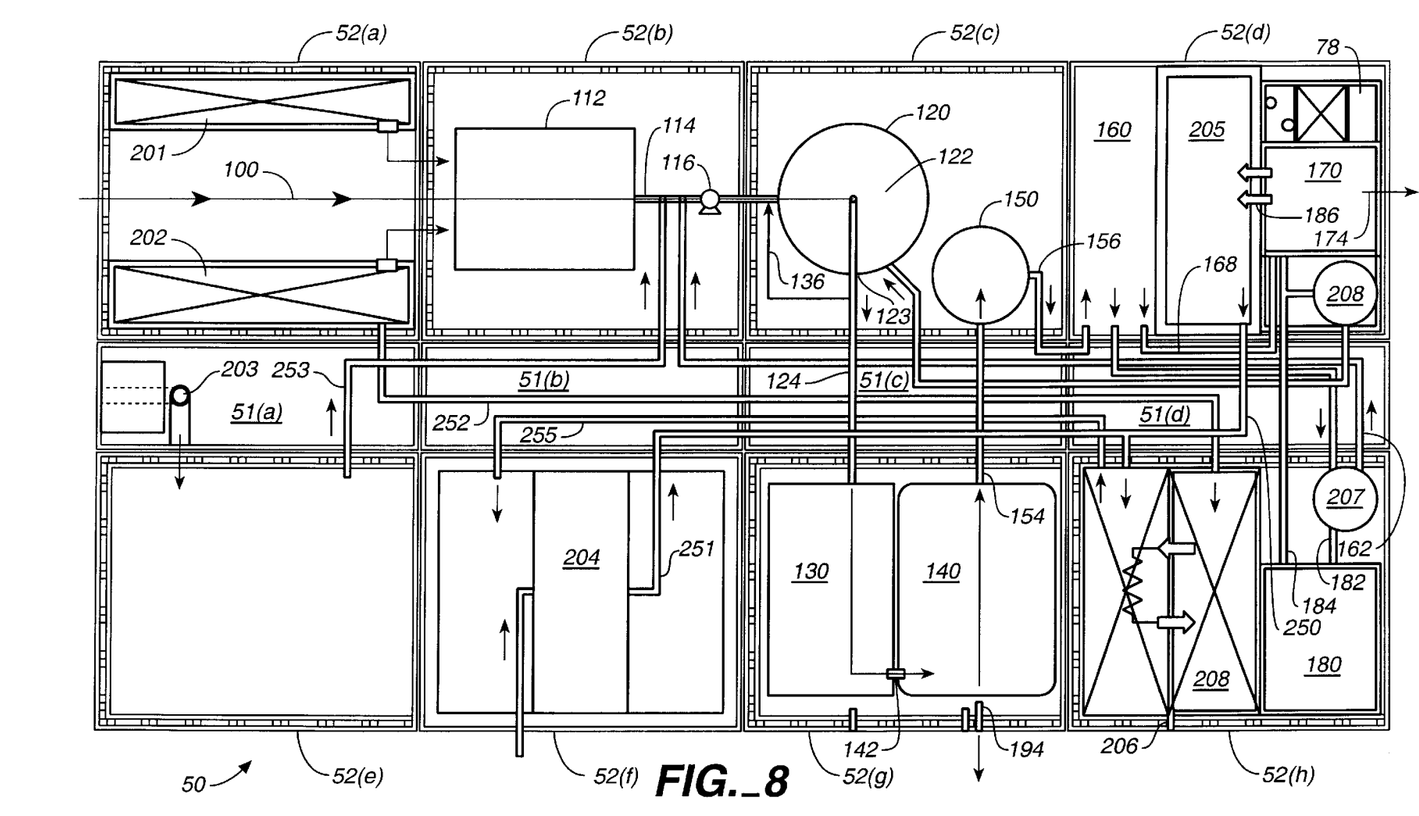
FIG. 8 is a plan view of a modular utility service system.
Figure 9:
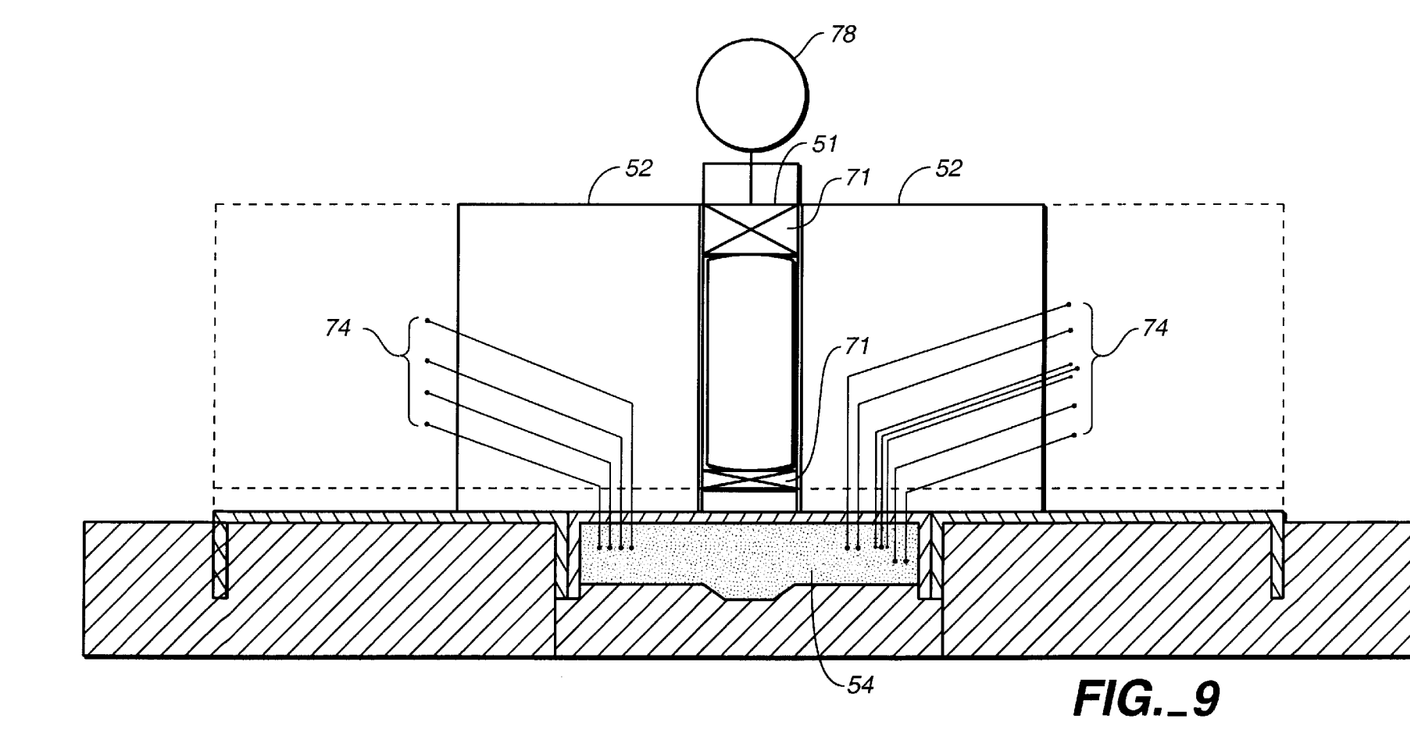
FIG. 9 is a cross-sectional view of a modular utility service system.

The utility service system preferably comprises plural modules which can be rapidly installed and mass produced. With reference to FIGS. 4 and 8, the utility service system 50 includes a solid waste/sewage/water module 52(*a*), an all waste processing module 52(*b*), a reformers module 52(*c*), and a heat exchanger/thermal storage/fuel cell/oxygen storage module 52(*d*). Each of these modules are coupled together and are further coupled to a waste water/sewage holding/processing module 52(*e*), a chill water production/storage module 52(*f*), a methanol production/storage module 52(*g*), and a heat pump/water storage/electrolyzer module 52(*h*). A plurality of vertical connector modules 51(*a*)–(*d*) couple process modules 52(*a*)–(*d*) to process modules 52(*e*)–(*h*). As shown in FIG. 9, a vertical connector module 51 is on a horizontal utility module 54 having a plurality of utility lines 74. The vertical connector module 51 can have a number of pipe racks 71 disposed between the process modules 52 to provide communication between the coupled process modules. Each process module and connector module can have dimensions of 10×10×10 ft$^3$ or smaller, and can be transported by truck, train or forklift. When the process modules are coupled together, the coupled unit can have dimensions of less than about 40×20×10 ft$^3$. It is apparent that the preferred utility service system embodiments are much smaller than conventional utility service systems. The reduced size of the utility service system embodiments permit them to be rapidly deployed at locations which do not have a suitable infrastructure for utilities.

As shown in FIG. 4, the utility service system may include a solar panel 59, which can convert solar energy into electricity and heat which can be used by the utility service system or a building which is serviced by the utility service system 50. Although the solar panel 59 is shown in FIG. 4 as being located adjacent to the vertical utility modules, solar panels can be present at any appropriate location.

Preferred utility service systems include one or more fuel cells. For example, the utility service system can include one or more commercially available PEM (proton exchange membrane) membrane fuel cells such as those supplied by Ballard Energy Systems of Vancouver, Canada. The individual fuel cells can be purchased in 50 or 100 kW sizes.

More specifically, the utility service system is preferably a stand-alone, self sustainable, regenerable utility service system such as a solar regeneration fuel cell system. Preferred solar regeneration fuel cell systems provide electrical energy from a methanol driven fuel cell. The methanol is produced from syngas, which is in turn produced by a waste steam-reforming process, thus providing self-sufficient, sustainable energy from waste conversion. Methanol is safe to use in fuel cells to make electricity at night or when cloudy weather conditions occur. For example, a syngas such as a 60 $H_2$/30 CO/5 $CO_2$/5 $H_2O$ (volume %) gaseous mixture is generally used to manufacture or produce a methanol-water mixture, which is generally not flammable at room temperature even in the presence of an open flame and excess air.

In a preferred process, a rotary waste feeder steam-reforming system is used to turn solid or liquid waste into gas. The gas from the rotary feeder is sent to a high temperature steam reformer where fairly pure "balanced" syngas is produced. A typical syngas comprises at least one of carbon oxides (e.g., CO, $CO_2$) and hydrogen. The fluid stream comprising the waste-converted gas, a carbon dioxide recycle stream, and a stream including electrochemically produced hydrogen are fed to the high temperature steam reformer. A small electrolyzer can be used to produce the hydrogen. In the steam reformer, superheated steam and hydrogen react with the entering organic materials to form syngas and light hydrocarbons. A preferred ratio (e.g., mass, volume, or molar) of hydrogen to carbon monoxide is between 1.75 and 2.25 (e.g., 2.00) for the production of the "balanced" syngas. As will be described in further detail below, the syngas is eventually used to produce electricity.

Figure 7:
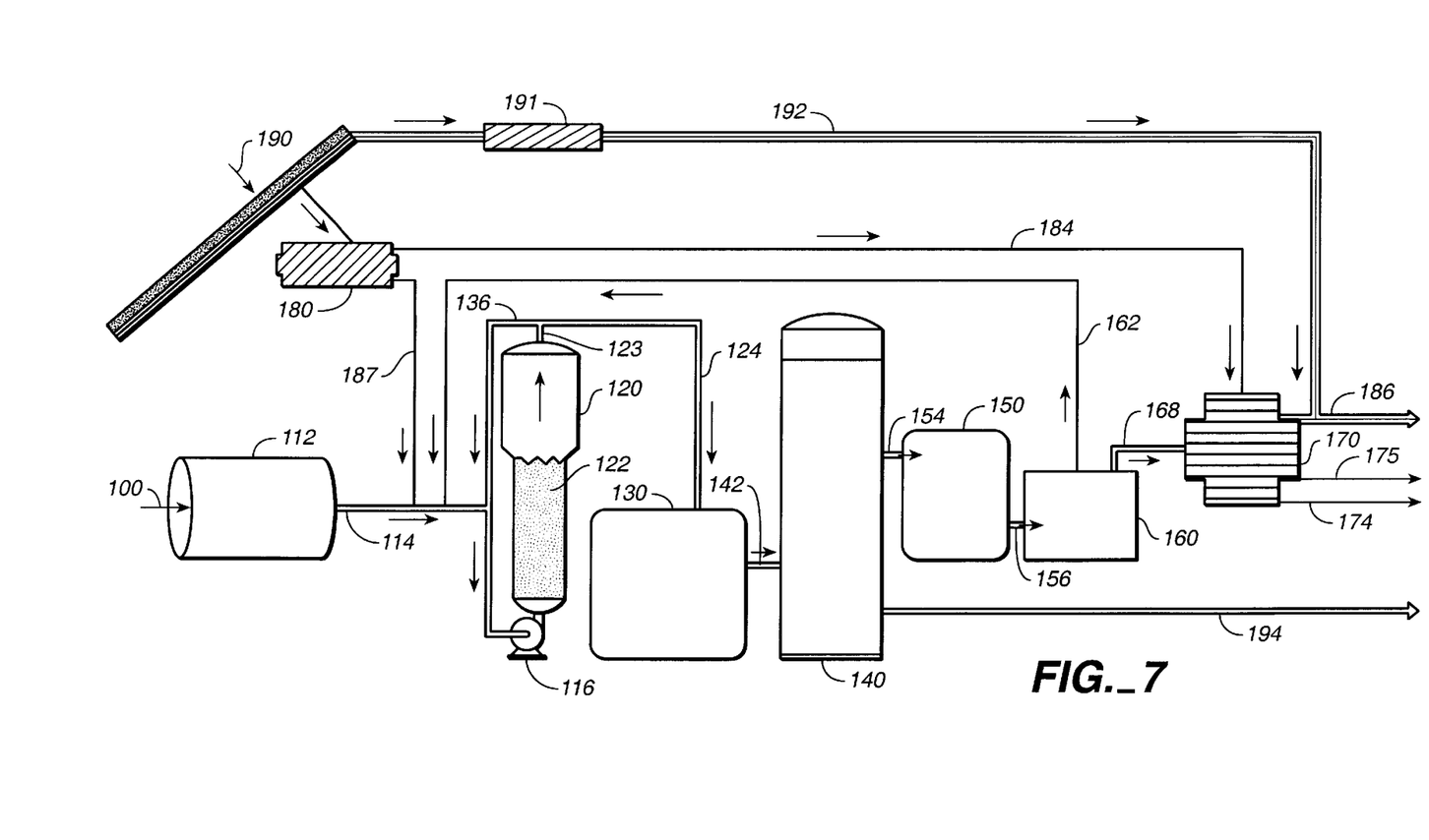
FIG. 7 is a schematic process flow diagram showing a preferred process flow for creating electricity.

Solar regeneration fuel cell systems are shown in FIGS. 7 and 8. The systems shown in FIGS. 7 and 8 can provide utility services to any suitable number of buildings. The utility service system is nearly energy self-sufficient and uses solar energy and waste (e.g., in the form of household garbage) to produce energy. When solar energy is not available, stored methanol drives a fuel cell to produce electricity for, e.g., a housing complex. Excess methanol produced by the system can be used for methanol fuel cell cars and buses. Advantageously, the solar regeneration fuel cell system can be used in remote areas or developing foreign countries which do not have a suitable utility infrastructure.

Referring now to FIGS. 7 and 8, carbonaceous waste is passed via line 100 into rotary waste feeder 112 to convert the waste to a gas. As shown in FIG. 8, sewage from sewage processing system 201 and sewage from a water purification system 202 can be provided to the rotary feeder 112 as well. The gas output from feeder 112 is sent via feed line 114 and pump 116 to high temperature steam reformer 120 containing steam 122. As shown in FIG. 8, additional organic material (e.g., methane) can be supplied through line 253 and can be fed downstream of the rotary waste feeder 112 into line 114 from the water/sewage holding/processing module 52(e). The organic material can be derived from sewage from a sewer line 203. In the reformer, 120, the waste gas in line 114 is converted to balanced syngas at temperatures in the range of about 400° and about 700° C. The balanced syngas is passed from outlet 123 through line 124 to methanol synthesis plant 130. A portion of the syngas is recycled to feed line 114 through line 136 to maintain minimum fluidization velocity. The methanol recovered from methanol plant 130 is passed to methanol storage tank 140 via line 142. Methanol from tank 140 is converted to syngas in low temperature steam reformer 150 after passing via line 154. The syngas is passed via line 156 to selective oxidation catalyst heat exchanger 160 to convert the CO to $CO_2$ which is recycled through line 162 to feed line 114. As shown in FIG. 8, the $CO_2$ may optionally pass through a syngas mixer 207. Hydrogen from the selective oxidation catalyst heat exchanger 160 passes via line 168 to a first half-cell of a fuel cell 170. With reference to FIG. 8, the products from the first half-cell include water and heat, which can pass to a water storage tank 205. Electrolyzer 180 energized with the electricity 174 generated in fuel cell 170 and from solar panels 190 decomposes water into hydrogen and oxygen. The hydrogen is fed via line 182 to feed line 114 to ensure that a balanced syngas is produced and passed to methanol plant 130. The oxygen from electrolyzer 180 passes via line 184 to the second half-cell of fuel cell 170 to serve as the optimum oxygen-containing gas for the fuel cell cathode for the production of electricity 174 and thermal energy 186. As shown in FIG. 7, thermal energy 192 that is also generated from solar PV (photovoltaic) panels 190 is combined with thermal energy 186 generated by fuel cell 170 to complete the energy balance. Any excess thermal energy 186 can be sold or stored in a thermal energy storage unit 191. The excess methanol from tank 150 passing in line 194 can be used as a fuel source.

As shown in FIG. 8, heat from the water in the storage tank 205 and from a refrigeration system unit 204 can pass to a heat pump system 205 via lines 250, 251. The heat pump system 208 may alternatively be an absorption chiller. Also, water from the filtration system 202 can pass via line 252 to water storage unit 206, which is heated by heat from the water pump system 208. Chill water can pass from the heat pump system 208 to the chill water/production/storage module 52(f) via line 255.

FIGS. 8 and 9 show a master communications system 78 including a wireless communications element. Preferably, the master communications system is a wireless telemonitoring/support system. The wireless communications element permits the utility service system to be controlled and monitored at a different location via a wireless communications link. For example, the master communications system may have an antennae so that radio frequency signals can be received from and transmitted to a second location away from the utility service system. By using a wireless communications element to control and monitor the utility service system, the utility service system can be automatically or manually controlled and monitored without having significant numbers of skilled technicians on-site.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

Moreover, any one or more features of any embodiment of the invention may be combined with an one or more other features of any other embodiment of the invention, without departing from the scope of the invention. For example, although the vertical utility modules have been described in some detail, it is understood that any feature described with respect to the vertical utility modules may also be used with the previously described horizontal utility module. The foundation (256) and steel pier (257) are indicated.

What is claimed is:

1. A wall structure comprising:
   a utility module; and
   a structural insulated panel disposed adjacent to the utility module, wherein the utility module comprises
- a body including a generally planar first surface, a generally planar second surface opposite the first surface, and an edge region between said first and second surfaces,
- a utility line within the body,
- a first coupling element at said edge region,
- a second coupling element at said first surface in communication with said first coupling element via the utility line, and
- an additional structural insulated panel comprising a thermal insulation material.

2. The wall structure of claim 1 wherein the structural insulated panel comprises expanded polystyrene.

3. The wall structure of claim 1 wherein the structural insulated panel comprises concrete or concrete composites.

4. The wall structure of claim 1 wherein the structural insulated panel comprises a thermal insulation material.

5. The wall structure of claim 1, further comprising one or more sinks.

6. The wall structure of claim 1, further comprising one or more showers.

7. The wall structure of claim 1, further comprising one or more bathtubs.

8. The wall structure of claim 1, further comprising one or more toilets.

9. The wall structure of claim 1, further comprising one or more faucets.

10. A modular house comprising:
- a foundation; and
- a plurality of wall structures disposed over said foundation, where each of said wall structures comprises the wall structure of claim 1.

11. The modular house of claim 10 further comprising:
- a plurality of elongated load bearing members adjacent to the foundation.

12. The modular house of claim 11
- wherein the load bearing members each have a first end and a second end, and
- wherein the first end is proximate to the foundation and the second end is distal to the foundation.

13. The modular house of claim 11 wherein the load bearing members comprise steel piers.

14. A utility service and distribution system comprising:
- a utility service system comprising a fuel cell; and
- a utility distribution system operatively coupled to the utility service system,
- wherein the utility distribution system comprises
  - a plurality of utility modules coupled together via quick-connect coupling elements on respective adjacent utility modules to provide communication between utility lines in the adjacent utility modules.

15. The system of claim 14 wherein the utility service system is at a first location and further comprises a wireless communications element, the wireless communications element being adapted to receive instructions for controlling the utility service system from a second location.

16. The system of claim 14 wherein the utility service system comprises a solar regeneration fuel cell system.

17. The system of claim 14 wherein the utility service system comprises a methanol storage unit operatively coupled to the fuel cell.

18. The system of claim 14 wherein the utility service system further comprises a waste steam reformer, the waste steam reformer being used to produce hydrogen-rich syngas.

19. The system of claim 14 wherein the utility service system is adapted to convert syngas into methanol, wherein the methanol is used for energy creation or transportation.

* * * * *